United States Patent
Cunningham et al.

(10) Patent No.: US 6,360,095 B1
(45) Date of Patent: Mar. 19, 2002

(54) HOME LOCATION REGISTER FOR A MOBILE TELECOMMUNICATIONS NETWORK

(75) Inventors: Joseph Cunningham; Augustine Collins; Aidan Dillon, all of Dublin (IE)

(73) Assignee: Markport Limited, Dublin (IE)

( * ) Notice: Subject to any disclaimer, the term of this patent is extended or adjusted under 35 U.S.C. 154(b) by 0 days.

(21) Appl. No.: 09/169,929

(22) Filed: Sep. 24, 1998

Related U.S. Application Data

(63) Continuation of application No. PCT/IE96/00015, filed on Mar. 28, 1996.

(51) Int. Cl.[7] .................................................. H04Q 7/20
(52) U.S. Cl. ...................... 455/433; 455/424; 455/435
(58) Field of Search ................................. 455/433, 507, 455/517, 412, 403, 424, 560, 435

(56) References Cited

U.S. PATENT DOCUMENTS

| | | | | |
|---|---|---|---|---|
| 5,537,594 A | * | 7/1996 | Shannon et al. | 395/650 |
| 5,546,455 A | * | 8/1996 | Joyce et al. | 379/265 |
| 5,594,863 A | * | 1/1997 | Stiles | 395/182.13 |
| 5,727,057 A | * | 3/1998 | Emery et al. | 455/433 |
| 5,732,214 A | * | 3/1998 | Subrahmanyam | 395/200.12 |
| 5,854,982 A | * | 12/1998 | Chambers et al. | 455/433 |
| 5,937,343 A | * | 8/1999 | Leung | 455/403 |

FOREIGN PATENT DOCUMENTS

| | | |
|---|---|---|
| GB | 2269962 | 2/1994 |

OTHER PUBLICATIONS

Electrical Communication, Feldmann et al, "GSM Network Systems and Overall System Integration", Jan. 1, 1993, pp. 141–154.
Wireless Networks . . . , vol. 3, Leskinen, "GSM Subscriber Management on Top of a Generic TNM Agent", 1994, pp. 1004–1008.
Proceedings Second Intl Workshop . . . , Hyun et al, "Real–time mobile data . . . ", Tokyo, Japan, Oct. 1995, pp. 125–129.

* cited by examiner

Primary Examiner—William Trost
Assistant Examiner—Simon Nguyen
(74) Attorney, Agent, or Firm—Jacobson Holman, PLLC

(57) ABSTRACT

A HLR (10) has a bus (11) which interconnects a NAP layer (12), a DBS layer (13) and an OMP layer (14). All accesses to a memory database (26) are through a single channel—the associated DBS (25) with associated databases (26, 27). Each NAP (20) has a directory service (21) identifying the active DB (26) for each item of subscriber data. Each DBS (25) has a shadow DBS (25) to which it automatically writes for real time synchronization.

18 Claims, 6 Drawing Sheets

HOME LOCATION REGISTER FOR A MOBILE TELECOMMUNICATIONS NETWORK

This is a continuation application of PCT/IE96/00015, filed Mar. 28, 1996.

BACKGROUND OF THE INVENTION

Field of the Invention

The invention relates to a home location register (HLR) for a digital mobile telecommunications system. Traditionally, the HLR has had a distributed configuration located at the mobile switching centres. However, as systems increased in size with increasing numbers of subscribers, the HLR became complex and, at times, unworkable.

There has therefore been a trend towards separating the HLR from the mobile switching centres and providing a more centralised configuration. An example is that described in British Patent Specification No. GB 2269962. This HLR comprises a number of access processors connected to a bus. Each access processor stores all permanent subscriber data and a subset of the temporary subscriber data such as visitor location data. The HLR includes a link device which allocates queries by polling and possibly re-direction of access requests over the bus.

A problem with such an arrangement is that the databases are dedicated to particular access processors and therefore linear growth in subscriber numbers is directly linked to access processors. This can lead to lack of fault tolerance, to complexity, and to the need for additional control functions. It is also expensive.

A further problem is that the polling and re-direction signals transmitted from the link device cause a large degree of bus traffic and possibly slower response times.

There is therefore a need for a HLR which is "future proof" whereby it may be easily modified to accommodate increasing numbers of subscribers in a simple and flexible manner. Further, there is a need for a HLR which is more fault tolerant, and for a HLR which is simpler to maintain and update.

SUMMARY OF THE INVENTION

According to the invention, there is provided a mobile telecommunications network home location register comprising:

a high speed bus;

at least two database servers, each directly connected to a database of subscriber data, and connected to the bus;

at least one network access processor connected to the bus and comprising means for accessing subscriber data on the memory databases via the bus and the database servers;

a maintenance processor having operator interfaces, being connected to the bus, and comprising means for accessing subscriber data on the memory databases via the bus and the database servers; and a storage database.

This arrangement provides for simple upgrading and also simple fault tracing and maintenance generally. The access processor and database capacities may be independently increased. Further, there is universal access to subscriber data through a single channel for each database, namely the database server. This provides for effective control of subscriber data access.

In one embodiment, the network access processor comprises a directory service indicating location of subscriber data on the memory databases. This allows fast access and minimises bus traffic by avoiding the need for network access processor polling. Preferably, the maintenance processor comprises means for updating the directory service. This is a simple method of achieving consistency across the HLR.

In one embodiment, each item of subscriber data is stored in an active location on one memory database and also in a shadow location on a different memory database. Preferably, the directory service of the network access processor identifies the database server having access to the memory database storing the active locations for each item of subscriber data. In another embodiment, the database servers each comprise means for dynamically updating the shadow locations upon updating the associated active locations. These features provide for simple maintenance of shadow databases with little bus traffic.

Preferably, the database server comprises means for updating the shadow locations according to one of a plurality of pre-stored schemes according to desired performance and security levels.

In one embodiment, the network access processor comprises means for performing a transaction-oriented commit when updating a memory database whereby an update is not committed by the database server until the network access processor ends the transaction.

In another embodiment, the network access processor comprises means for uploading bus status and error signals to the maintenance processor.

In a further embodiment, the maintenance processor comprises means for partitioning the subscriber data between memory databases by control of the database servers.

In another embodiment, the maintenance processor is directly connected to the storage database and comprises means for accessing the memory databases via the database servers to update the storage database. For redundancy, the maintenance processor may comprise means for replicating the subscriber data in the storage database.

In one embodiment, the home location register further comprises an auxiliary processor connected to the bus and comprising means for accessing subscriber data in the memory databases via the bus and the database servers.

In one embodiment, each database server comprises a core connected to a database handler, in turn connected to the memory database and to a plurality of external handlers connected to the bus.

Preferably, the core comprises a plurality of finite state machine dialogue handlers, each for performing core operations of a single transaction at one time.

In another embodiment, an external handler comprises means for activating a dialogue handler upon receipt of a transaction request, and means for identifying by way of a parameter value the transaction and the dialogue handler.

Preferably, the external handler, the dialogue handler and the database handler comprise means for identifying subscriber data retrieved in the transaction as an object having an identifier and a server memory location.

In one embodiment, the dialogue handler comprises means for identifying the external handler for a particular transaction by way of a temporary identifier.

In a further embodiment, each database server comprises means for identifying dirty subscriber data items, namely those which have not been updated to the storage database. Preferably, each database server determines if any item has been updated to the storage database if a request is received from the maintenance processor for a subsequent item to be updated. Preferably, the dirty items are identified by a flag within each item.

In the latter embodiment, each database server preferably comprises means for immediately changing the flag to a clean status after transmitting the item to the maintenance processor to update the storage database, and for setting it again to a dirty status if a negative response is received from the maintenance processor.

DESCRIPTION OF THE DRAWINGS

The invention will be more clearly understood from the following description of some embodiments thereof, given by way of example only with reference to the accompanying drawings in which.

DESCRIPTION OF THE INVENTION

Figure 1:
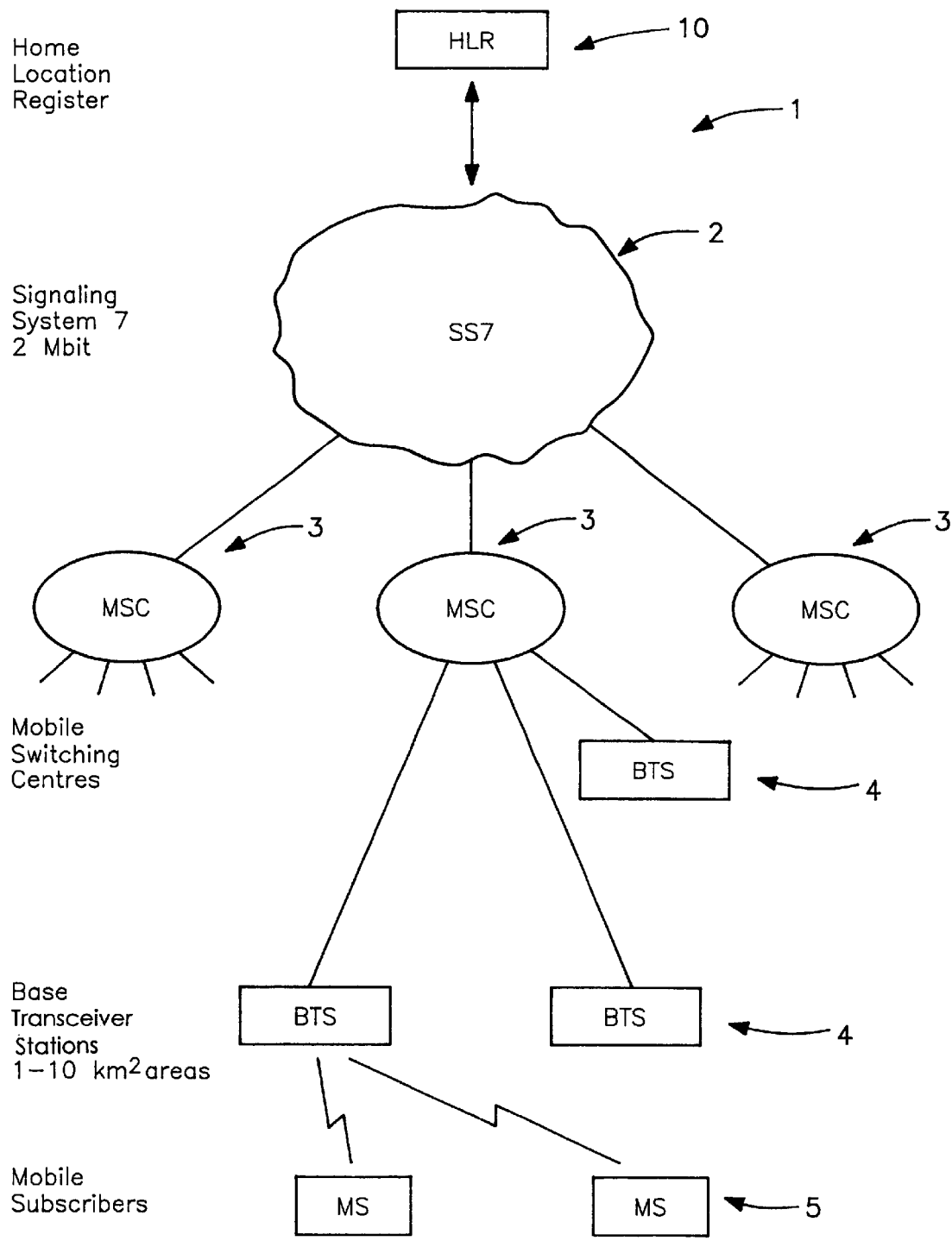
FIG. 1 is a general schematic representation of a mobile telecommunications system incorporating a home location register of the invention.

Referring to the drawings, and initially to FIG. 1, there is shown a mobile telecommunications system 1 incorporating a home location register (HLR) 10. The system 1 comprises a signalling system 2 of the 2 SS7 type. A number of mobile switching centres (MSC) 3 are connected to the SS7 and each is associated with a number of base transceiver stations (BTS) 4. Each BTS receives signals from mobile subscribers (MS) 5. At this level, such a system is conventional.

Referring now to FIGS. 2 to 6, the HLR 10 of the invention is described in detail. At the heart of the HLR 10, there is a high-speed bus 11 which is connected directly to three functional layers as follows:

a network access processor layer 12 connected to the SS7, a database server layer 13, and an operations and maintenance processor layer 14 accessible by administration operators.

The high speed bus 11 is a pair of parallel serial links which can operate at 10 to 100 Mbits/s. The second link provides redundancy.

Figure 2:
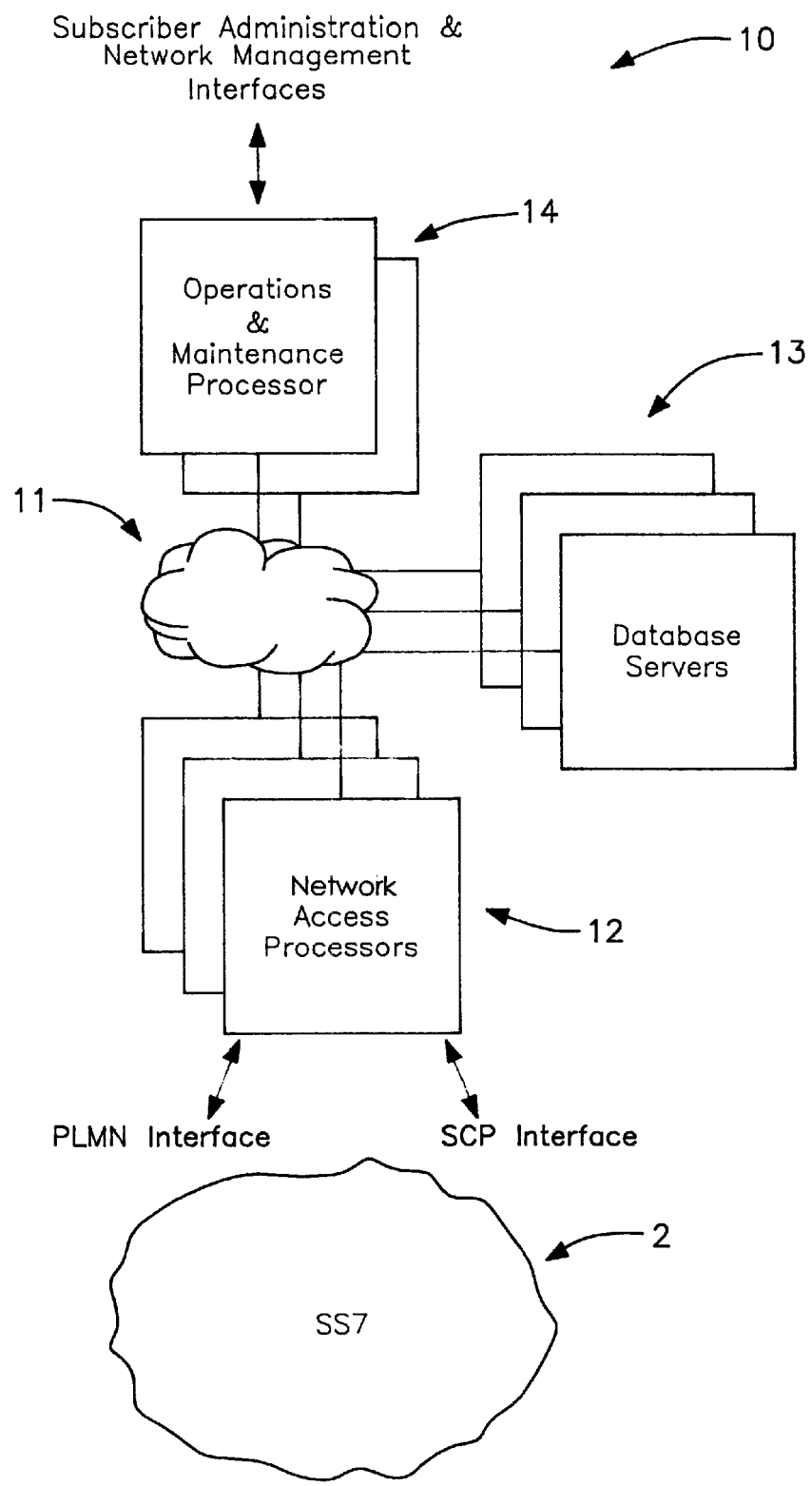
FIG. 2 is an overview schematic representation of the home location register of the invention.

It will be clear from the general schematic of FIG. 2 that an important aspect of the HLR 10 is that the database server layer 13 is separate from the network access processor layer 12. It will also be clear that all routing of signals between layers is through the bus 11, which acts as a central router.

Figure 3:
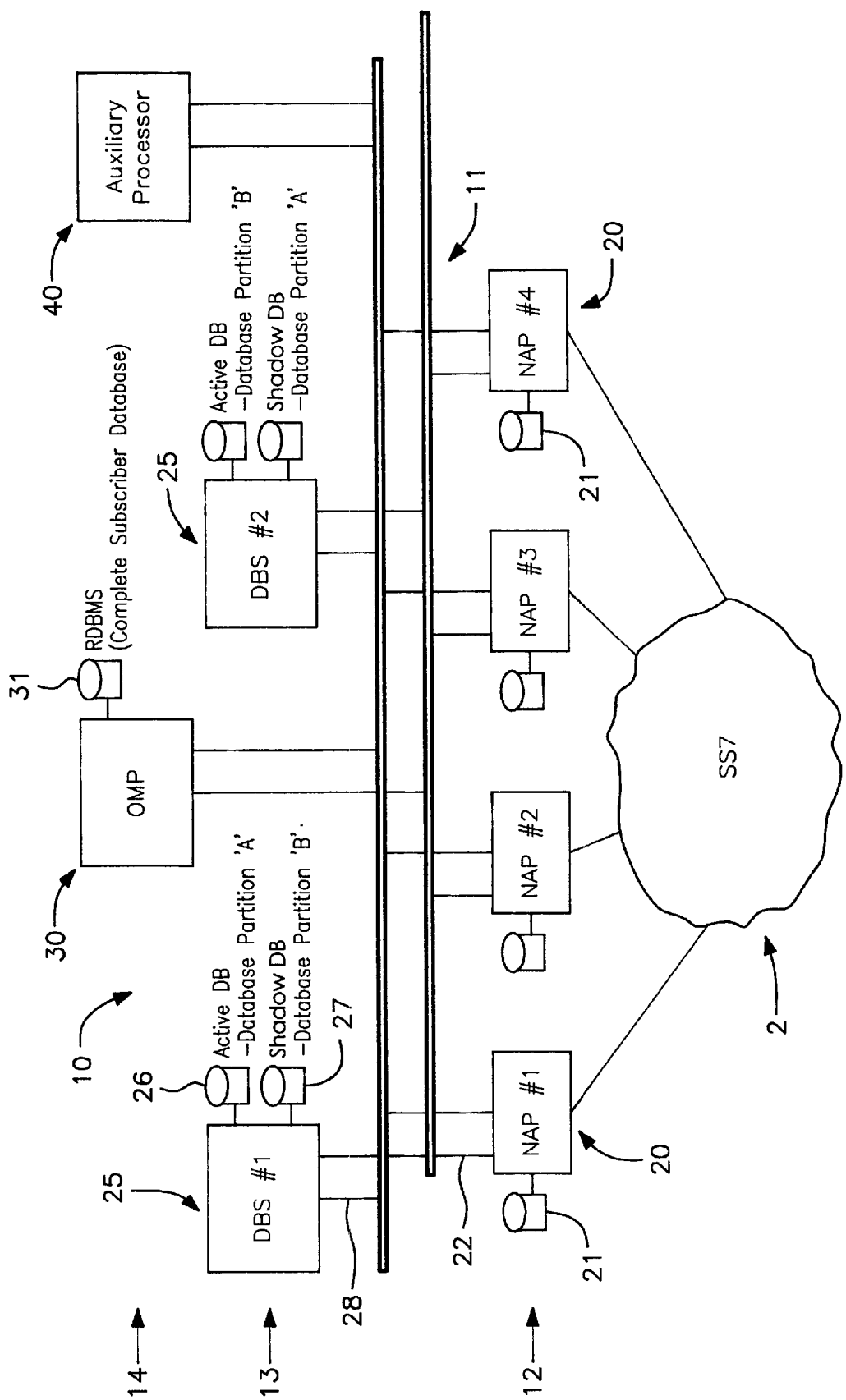
FIG. 3 is a more detailed representation of the home location register.

Referring in particular to FIG. 3, the network access processor layer 12 comprises a number of network access processors (NAPS) 20, each having a directory service 21. The NAPs 20 are connected to the bus 11 by links 22.

The database server layer 13 comprises in this embodiment two database servers 25, each directly connected to an active memory database (DB) 26 and a shadow memory database (DB) 27 and being connected to the bus 11 by links 28. An important point is that all accesses to a memory database are through a single channel, namely the associated DBS.

The operations and maintenance processor layer 14 comprises an operations and maintenance processor (OMP) 30 having a subscriber disk database 31.

Finally, the HLR 10 comprises an auxiliary processor 40. Interconnection of the elements via the bus 11 is through inter-process communication (IPC) interfaces which overlie the standard operating system IPCS, such as UNIX IPCs.

The components of the HLR 10 may be remotely or locally arranged—the bus 11 being provided according to the requirements.

Each of the DBSs 25 manages a subset of all subscriber data and all NAPs 20 have access to all of the DBSs 25. In order for the NAPs 20 to be totally independent of the DBSs 25, they include the directory service 21 which comprises a RAM-based table which contains:

primary data access keys;

identification of the server associated with the memory database having the active location for an item of subscriber data; and identification of the server associated with the memory database having the shadow location for an item of subscriber data.

In this embodiment, the shadow locations for active locations of one memory database 26 are all on the same shadow memory database 27. The OMP 30 dynamically updates the directory services 21 with the active location data so that when a NAP 21 is to perform a transaction, it routes the request to the correct DBS 25 the first time. This helps to provide a fast response within the HLR 10 as seen by the MSCs 3 by minimising bus traffic. Once a transaction is performed with the relevant active memory database 26, the DBS 25 automatically updates the shadow memory database 27 via the bus 11. The transactions are performed by the NAP 20 as a transaction-oriented commit whereby the DBS 25 does not commit a data update until the NAP 20 ends the transaction. This allows error recovery during complex operations. If the active DB is inaccessible, the NAP 20 accesses the shadow DB instead, this being indicated in the directory service 21.

Figure 4:
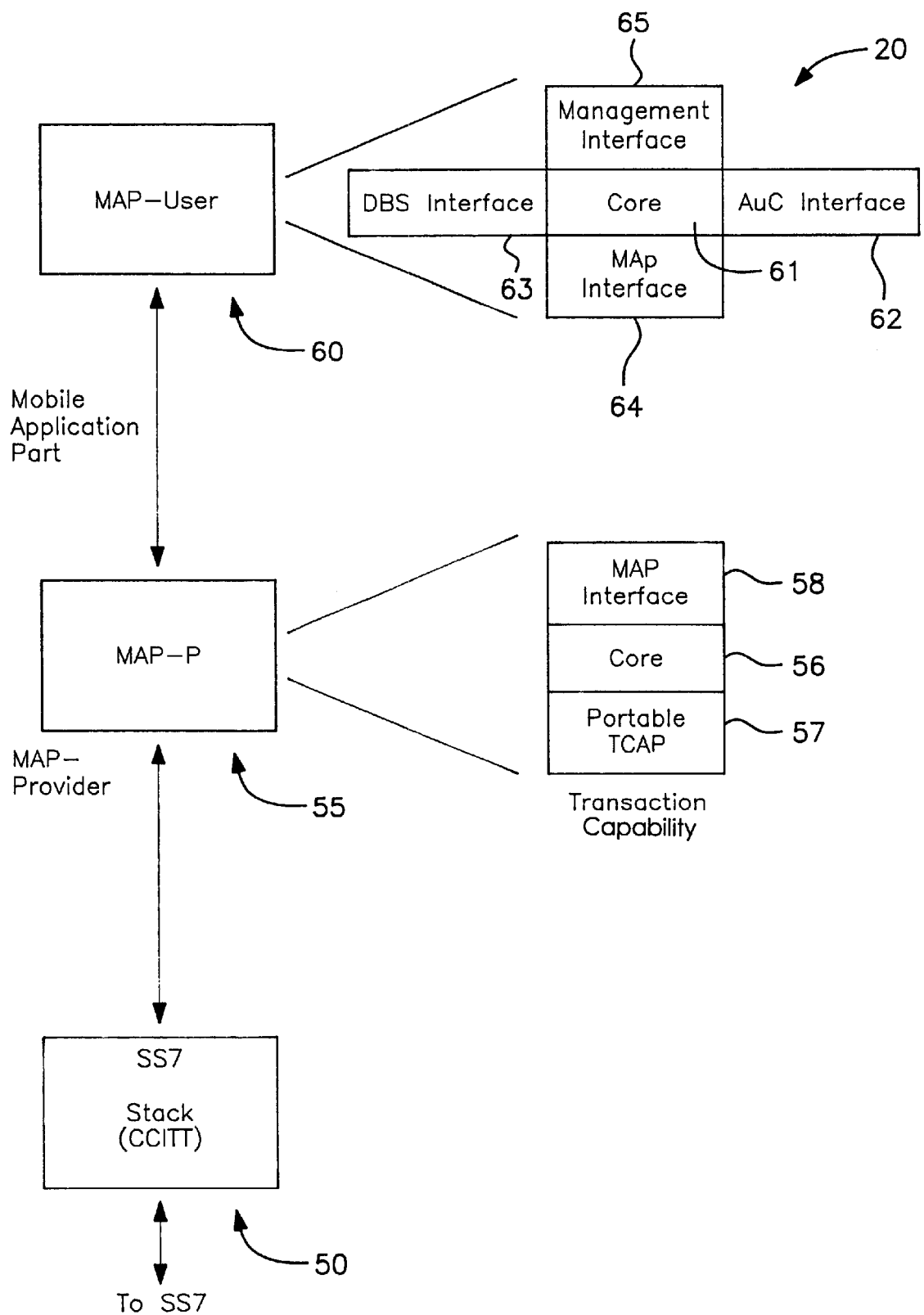
FIG. 4 is a schematic representation of a network access processor of the home location register.

Referring in particular to FIG. 4, the structure of each NAP 20 is illustrated. It comprises an SS7 stack as specified and this is connected to a Mobile Application Part—Provider (MAP-P) 55, in turn connected to a Mobile Application Part—User (MAP-User) 60. The MAP-P comprises a core 56, a Portable TCAP 27 and a MAP interface 58. The MAP-User 60 comprises a core 61, an Authentication Centre (AuC) interface 62, a DBS interface 63, a MAP interface 64, and a management interface 65. This modular construction allows simple modification and upgrading, and also simpler operation. The NAP 20 uses the management interface 65 to upload bus status and error signals to the OMP 30. This is important because it causes bus errors to be immediately flagged and the necessary error recovery operations performed. This is achieved by monitoring resources and port/interface integrity. Each DBS 25 also uploads error signals to the OMP 30.

Figure 5:
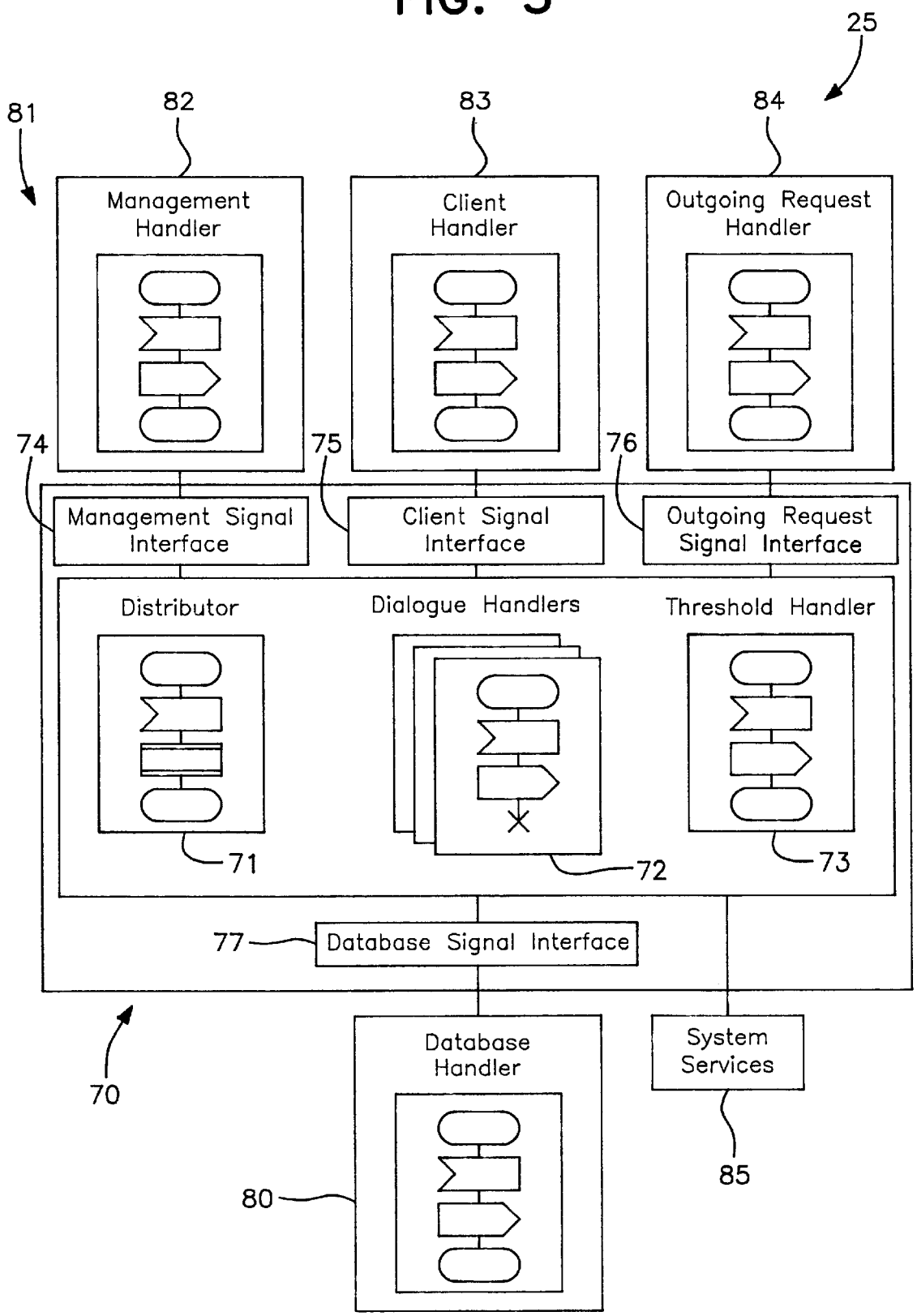
FIG. 5 is a schematic representation of a database server of the home location register.

Referring to FIG. 5, each DBS 25 comprises a core 70 having a distributor 71, dialogue handlers 72, and a threshold handler 73. These components together communicate through management 74, client 75, outgoing request 76, and database 77 signal interfaces to various handlers. A database handler 80 provides access to the databases 26 and 27. There is a set of external handlers connecting the core 70 as shown to the bus 11. These include a management handler 82, a client handler 83 and an outgoing request handler 84. The DBS 25 also comprises system services 85.

The DBS 25 is designed using functional decomposition methodology and specification and description language (SDL) and is hardware independent. In this embodiment, the DBS 25 is on a HP-UX operating system. The dialogue handlers 72 are implemented as state machines activated by the distributor 71. Each dialogue handler instance handles only one transaction at any one time, and the limit of simultaneous transactions performed by all handlers 72 within the core 70 is monitored and controlled by the threshold handler 73.

The management handler 82 allows access by the OMP 30 and any other management/maintenance machines connected to the bus 11. It is through this handler that the DBS 25 is configured and start/stop and alarm signals are handled.

The client handler 83 allows access by clients generally, including the NAPs 20 and the OMP 30.

The outgoing request handler 84 allows the DBS 25 access the shadow memory database (DB) 27. There is only one shadow DB 27 for each DBS 25.

At start-up, the following sequence takes place within a DBS 25:

(a) The management handler 82 enables the database and client handlers 80 and 83. The client handler 83 is set to an "OMP-synchronising" state at which it will only accept connections from the OMP 30.
(b) The OMP 30 sends an ENABLE message to the core 70 via the management handler 82.
(c) The distributor 71 is enabled and an ENABLE-ACK signal is sent back to the OMP 30.
(d) The OMP 30 connects to the DBS 25 and starts OMP synchronisation.
(e) The OMP 30 sends an UNLOCK message to the core 70 via the management handler 82.
(f) The core 70 unlocks the client handler 83, allowing all clients (such as NAPs 20) to connect. It then sends an UNLOCK-ACK to the management handler 82.
(g) The OMP 30 sends a PEER-SYNC message to the core 70 via the management handler 82. This instructs the DBS 25 to synchronise with its particular shadow DB 27.
(h) The core 70 enables the outgoing request handler 84 and begins to send peer synchronisation requests to the shadow DB 27. When this is complete, it sends a PEER-SYNC-ACK signal to the management handler 82.

After start-up, the OMP 30 transmits subscriber data to the active DB 26 of each DBS 25 according to a desired partitioning strategy. For example, the data may be partitioned for three DBSs 25 as follows:

| Partition A | Partition B | Partition C |
|---|---|---|
| 40% of subscribers Shadow for Partition C. | 40% of subscribers Shadow for partition A. | 20% of subscribers Shadow for Partition B. |

Because the DBSS 25 and the DBs 26, 27 are independent of the NAPs 20 and directly addressable by the OMP 30 via the bus 11, any desired partitioning scheme may be used. It is also possible to put all subscriber data on a single DBS 30. The important point is that there is complete flexibility.

The DBs 26, 27 are in RAM, however, all data is also stored in the disk database 31 directly connected to the OMP 30, on which it is replicated for additional fault tolerance. Data in an active DB 26 which has not been updated to the disk database 31 is referred to as "dirty" data and the manner of updating to change the status to "clean" is described below.

External management systems may have access to the OMP 30 either directly or via the bus 11 to:

(i) perform a remote log-in to gain access to the HLR management system,
(ii) provide a standard protocol for management of the HLR, or
(iii) provide a proprietary control for management of the HLR, e.g. operator man machine language (MML).

The auxiliary processor 40 may be an external management system, or alternatively a management reporting processor. Because of the overall configuration of the HLR 10, such processors may be easily connected.

Referring again to FIG. 5, the distributor 71 operates to activate a dialogue handler 72 upon receipt of a client request and messages are then transmitted through the client handler 83 directly, by-passing the distributor 71. Most client operations will cause the initiation of a database transaction, and some will cause the shadow DB 27 to be updated. A dialogue handler 72 manages these operations. An instance of a dialogue handler 72 is created for such a transaction and it is then responsible for the full transaction, and it exits when the transaction is complete.

The database handler 80 interfaces between the core 70 and the DBs 26, 27 and has a portable database API to provide it with a level of abstraction from the DBs 26, 27. The actual data retrieved from the DB 26 is not integrated into the SDL, but is instead referred to as an object having an area of memory within the core 70 and an identifier. The address of this area is passed to the database handler 80, and it is maintained by the external handler involved and may be accessed by the core 70 and the database handler 80.

The database handler 80 and the external handlers 81 communicate with the core 70 by interfaces 74–77. The following Table 1 defines the database signal interface 77 between the core 70 and the database handler 80. A transaction is referred to as a "dialogue" or "process".

TABLE 1

Database Signal Interface 77

| Signal Name | Description | Sent By |
|---|---|---|
| DB_BEGIN_TRANS | Begin a dialogue; inform the DB Handler of the Dialogue Handler's SDL process id. | Core |
| DB_BEGIN_ACK | Inform Core of database transaction id | Db Handler |
| DB_COMMIT | End a dialogue, committing database changes | Core |
| DB_ABORT | Abort a dialogue, with rollback if possible. | Core |
| DB_READ | Read data for instance of Object | Core |
| DB_READLOCK | Lock and Read data for instance of Object | Core |
| DB_READFIRST | Read data for first object in list | Core |
| DB_READNEXT | Read data for next object in list | Core |
| DB_WRITE | Perform Write (update/create/delete/clean/dirty) on instance of Object Unlock if KeepLock is false (if applicable) Dirty as specified by Dirty Flag (if applicable) | Core |
| DB_LOCK | Lock data for instance of Object | Core |
| DB_UNLOCK | Unlock data for instance of Object | Core |
| DB_DATA | Returns pointer to requested data "Last Element" will be true if this is the last response to a cursor request | Db Handler |
| DB_ACK | Acknowledges a request | Db Handler |
| DB_DIRTY_REQ | Get a dirty record Clean = true => dirty flag to be unset; | Core |

TABLE 1-continued

Database Signal Interface 77

| Signal Name | Description | Sent By |
|---|---|---|
| DB_DIRTY_DATA | Clean = false => dirty flag to remain. Returns type and contents of dirty record. "Last Element" will be true if there are no more dirty records. | Db Handler |

The signal DB_BEGIN_TRANS notifies the database handler 80 of the start of a dialogue (transaction). DB_COMMIT and DB_ABORT cause the dialogue to end.

Cursor requests are dealt with by the signals DB_READFIRST and DB_READNEXT, responses arrive in a DB_DATA signal.

Using the signal DB_READLOCK is equivalent to using the signal DB_LOCK followed by DB_READ. The former is provided so that possible performance advantages of combining locking and reading can be realised.

Each new instance of a dialogue handler 72 is recognised by a unique identifier. The database handler 80 uses this identifier to ensure that replies are directed to the correct core handler 71. Likewise, the database handler 80 provides a transaction identifier to the core.

As stated above, the interface 77 is independent of the structure of the actual data and an object is represented by a type identifier which is the object identifier and a pointer to an area of DBS operating system memory sufficiently large to hold the object.

The DB_WRITE signal has an operator parameter specifying the type of write operation to be performed.

Objects that are capable of being updated to the disk database 31 have a dirty field set by the client. The DB_CLEAN signal resets this fields value to CLEAN.

Dirty records are accessed sequentially and it is necessary to specify a value for a sequence flag in dirty record requests. The valid values are FIRST, NEXT, and LAST.

Responses from the database handler 80 contain a result field. Valid values are SUCCESS, FAILURE, NOTFOUND, and LOCKED.

The following Table 2 describes the client signal interface 75.

TABLE 2

Client Signal Interface

| Signal Name | Description | Sent By |
|---|---|---|
| CL_BEGIN_TRANS | Begin a dialogue; Inform Core of client transaction Id | Client H |
| CL_COMMIT | End a dialogue | Client H |
| CL_ABORT | Abort a dialogue, with rollback if possible. | Client H |
| CL_READ | Read data for instance of Object | Client H |
| CL_READLOCK | Lock instance of Object and read it | Client H |
| CL_READFIRST | Read data for first object in list | Client H |
| CL_READNEXT | Read data for next object in list | Client H |
| CL_R_UPDATE | Update Object and replicate to peer Unlock if KeepLock is false Dirty as specified by DirtyFlag | Client H |
| CL_NR_UPDATE | Update Object Unlock if KeepLock is false Dirty as specified by DirtyFlag | Client H |
| CL_R_CREATE | Create Object; replicate to peer Dirty as specified by DirtyFlag | Client H (Client Handler) |

TABLE 2-continued

Client Signal Interface

| Signal Name | Description | Sent By |
|---|---|---|
| CL_NR_CREATE | Create Object Dirty as specified by DirtyFlag | Client H |
| CL_R_DELETE | Delete object and replicate to peer | Client H |
| CL_NR_DELETE | Delete Object Unlock if KeepLock is false Dirty as specified by DirtyFlag | Client H |
| CL_LOCK | Lock data for instance of Object | Client H |
| CL_UNLOCK | Unlock data for instance of Object | Client H |
| CL_R_CLEAN | Clean dirty object; i.e. reset dirty flag to zero. Replicate to peer | Client H |
| CL_NR_CLEAN | Clean dirty object; i.e. reset dirty flag to zero. | Client H |
| CL_DATA | Returns pointer to requested data. "Last Element" will be true if this is the last response to a cursor request. | Core |
| CL_ACK | Acknowledges a request | Core |
| CL_DIRTY_REQ | Get a dirty record Clean = true => dirty flag to be unset; Clean = false => dirty flag to remain. | Client H |
| CL_DIRTY_DATA | Returns type and contents of dirty record. "Last Element" will be true if there are no more dirty records. | Client H |

Each new client transaction is recognised by a unique identifier. The core uses this identifier to ensure that replies are directed to the correct client handler process.

A parameter used in the CL_BEGIN_TRANS signal informs the core 70 of the kind of client issuing the request. The valid values for this parameter are OMP, Peer, and Network.

The outgoing request interface 76 allows replication to the peer (shadow) DB 27 and synchronisation from a peer DB on restart. The identity of the peer DB 27 is configurable by the OMP 30, as described above and the configuration is stored on a file which is read at startup. An important aspect of the invention is the fact that the nature of the replication is configurable, and three different schemes are illustrated in FIGS. 6(*a*), 6(*b*) and 6(*c*).

Figure 6A:
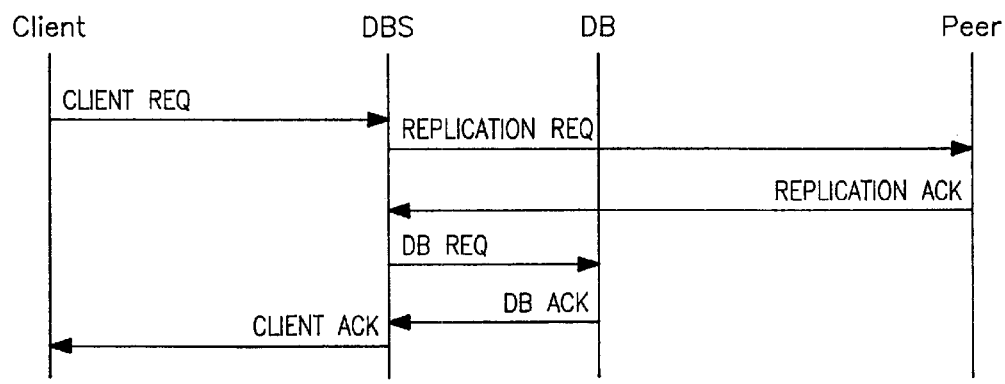
FIGS. 6(a), (b) and (c) are signal sequence diagrams of the database server.
Figure 6B:
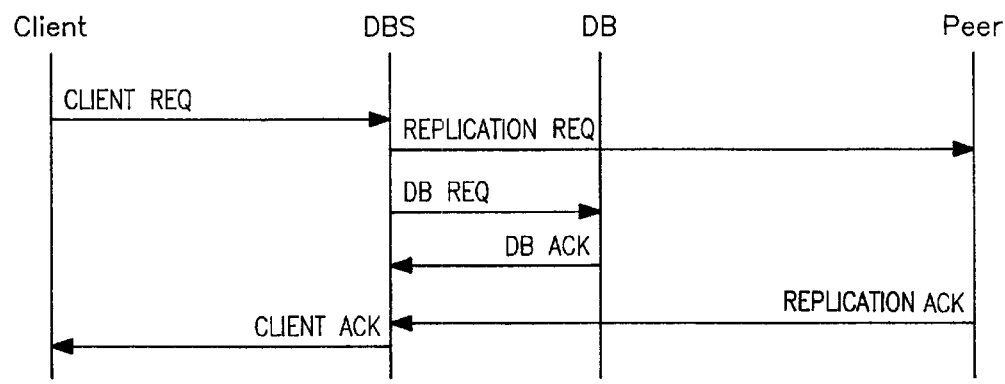
Figure 6C:
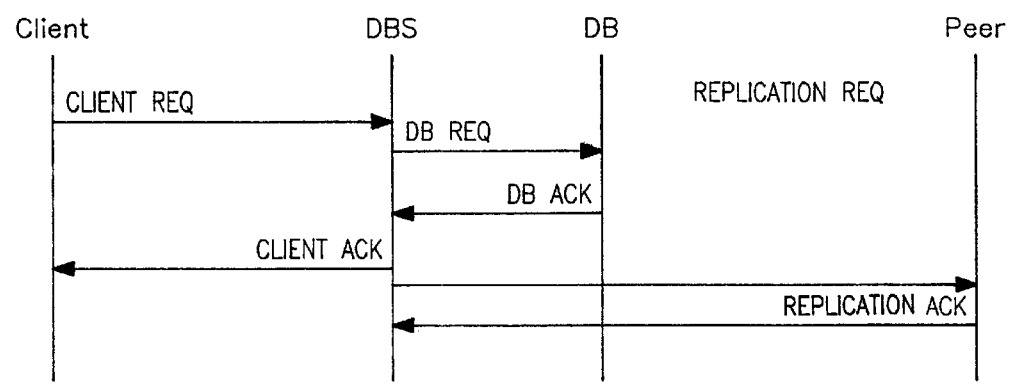

FIG. 6(*a*) shows a scheme whereby a database update and acknowledgement to the client only take place after replication has been acknowledged. This is the most secure scheme.

FIG. 6(*b*) illustrates a scheme where the DBS 25 does not wait for replication acknowledgement before writing to the memory DB 26. It does not acknowledge to the client until the replication acknowledgement is received. This provides an excellent level of security and also a good response time.

In the scheme shown in FIG. 6(*c*), the DBS 25 does not wait for the replication acknowledgement before either updating the database or sending an acknowledgement to the client. This provides a very fast response to the client.

Regarding the outgoing request signal interface 76, this is defined in Table 3 using SDL signals as follows.

TABLE 3

Outgoing Request Signal Interface 76

| Signal Name | Description | Sent By |
|---|---|---|
| REP_WRITE | Replicate a write (update/create/delete/clean/dirty) operation. | Core |

TABLE 3-continued

Outgoing Request Signal Interface 76

| Signal Name | Description | Sent By |
| --- | --- | --- |
| REP_ACK | Acknowledges replication request | outgoing Req. Handler |
| SYNC_DIRTY_REQ | Get a dirty record Clean = true => dirty flag to be unset; Clean = false => dirty flag to remain. | Core |
| SYNC_DIRTY_DATA | Returns type and contents of dirty record. "Last Element" will be true if there are no more dirty records. | Outgoing Req. Handler |

The interface 76 is designed to be independent of the structure of the actual objects being read or written as the core 70 is not concerned with such details. Thus an object is just represented by a type identifier (i.e. number) and a pointer to a location in memory that is sufficiently large to hold this object.

The management handler 82 provides the following functionality:

Startup and shutdown of the other handlers and the core 70.

Initialisation and on-line configuration of parameters, e.g. transaction limits, debugging flags, etc.

Statistics reporting.

Forward of alarms/events to the OMP 30.

The interface 74 is defined using SDL signals. All signals sent by the management handler 82 to the core 70 are handled by the distributor 71.

The following is a description of the management signal interface 74:

TABLE 4

MANAGEMENT SIGNAL INTERFACE 74

| Signal Name | Description | Sent By |
| --- | --- | --- |
| ENABLE | Causes Core DBS to connect to its database and external handlers so that synchronisation can begin. | Mgmt (Management Handler) |
| ENABLE_ACK | Acknowledges initialisation of Core; this tells the manager that the OMP can now begin to send synchronisation records to the DBS. Result = true => successful initialisation Result = false => unsuccessful initialisation | Core |
| SYNC | Tells DBS to begin synchronisation with another DBS. Clean = true => clean dirty records on synch | Mgmt |
| SYNC_ACK | Tells Management Handler that peer synchronisation has completed | Core |
| UNLOCK | Causes the Core DBS to move into the UNLOCKED state in which it will accept dialogues | Mgmt |
| UNLOCK_ACK | Acknowledges unlocking of Core | Core |
| LOCK | Causes the Core DBS to forcibly finish all outstanding dialogues and be moved to the LOCKED state. All outstanding dialogues are aborted. | Mgmt |
| LOCK_ACK | Acknowledges locking of Core | Core |
| SHUTDOWN | Causes the Core DBS to deny any further incoming dialogues. Currently outstanding dialogues are allowed to finish. When all are finished, the Core DBS moves to the LOCKED state. | Mgmt |
| SHUTDOWN_ACK | Acknowledges shutdown of Core | Core |
| DISABLE | Causes the Core to free all its resources Mgmt and close the database. | |
| DISABLE_ACK | Acknowledges disabling of Core | Core |
| REASSESS | Tells the DBS that the configuration data has been changed on-line. | Mgmt |
| OVERLOAD | Informs the Management Handler that the number of dialogues has exceeded gv_dbs_global.dial_upper_threshold. | Core |
| OVERLOAD_CLEAR | Informs the Management Handler that the number of dialogues has returned within gv_dbs_global.dial_lower_threshold. | Core |
| BUSY | Informs the Management Handler that the number of dialogues is at gv_dbs_global.max_dialogues | Core |
| EVENT | Allows the Core DBS to notify the Management Handler of a problem. | Core |

The core 70 generates events to be passed to the management handler 82 indicating programming errors, congestion, etc. These consist of an event number and a list of appropriate parameters indicating, for example, if the error is recoverable.

As stated above, dirty records are records that have been updated, created or deleted from the network but that have not been updated in the disk database on the OMP.

There are two uses of dirty records:
1. To distinguish which records have to be updated to the OMP disk database 31.
2. To complete synchronisation of a memory database after it has been synchronised with the OMP at startup.

Regarding use 1. above, an OMP update is under control of a process on the OMP 30. This process requests a dirty record from the DBS which replies with an acknowledgement incorporating the dirty record. The OMP extracts the data from the acknowledgement from the DBS, updates the disk database 31 and then requests the next dirty record.

The dirty record becomes clean if it is successfully updated in the OMP disk database 31. This acknowledgement is incorporated in the next request from the OMP to the DBS in the PrevResult field, for performance reasons. If this result is not successful, the record remains marked as dirty and the next request is processed.

There remains the problem of a dirty record being updated again from the NAP after the acknowledgement to the OMP has been sent, but before the next OMP request (incorporating the disk update acknowledgement) has been received. The DBS needs a mechanism to allow it to know that such a record should not be marked as clean in these circumstances.

This is solved by clearing the dirty bit before receiving the piggy-backed acknowledgement from the OMP. If the acknowledgement from the OMP is negative, the dirty bit can be set, thus marking the record as dirty again. If the record has been updated from the network (NAP) it will be marked as dirty in the usual way. This approach means there will be a single update of the dirty bit under normal conditions.

The rate of data transfer is under control of the OMP process, so an OMP-update can be operated at a rate that is as slow as is required.

An OMP update can be made continuous if the OMP-update process issues a CL_DIRTY_REQ(first) immediately after receiving a CL_DIRTY_DATA(last).

Regarding use 2. above, after a DBS has been synchronised with the OMP disk database, it may be necessary for it to be synchronised with its peer DBS. This will be necessary if the peer DBS has been servicing client requests while the DBS was being synchronised with the OMP disk database.

The DBS must now update its database with all the records marked as dirty on the peer database as these have not been updated to the OMP and therefore have not been downloaded from the OMP. It sends a request to the peer database server asking for the first dirty record in the database. The peer server will send the dirty record data in a response. The database server then asks for the next record and this continues until a single pass through the database has completed. The peer server then sends a notification indicating that it has completed sending dirty records. The dirty record sequence flag is used in this operation, as with an OMP update.

The peer database server does not change the status of the dirty records during this procedure.

In summary, by virtue of the fact that the memory databases are each accessed by a single channel only (the associated DBS 25) accesses are much more efficiently handled than heretofore as control is simpler. Because the DBSs are accessed directly via the bus 11, there is a large degree of versatility as subscriber expansion is not directly linked to the NAPs 20. The automatic updating to the shadow DB 27, the updating via the OMP 30 to the disk database 31, and the manner in which the components of each DBS 25 operate all lead to a large degree of fault tolerance. It has been found that the manner in which the data is handled and addressed only as an object is particularly effective at ensuring errors do not arise and a fast response to clients is provided. The DBS structure is modular, again providing flexibility. This has been achieved using the simple transaction, client, and object, and dialogue handler identification method described.

Another important advantage of the invention arises because the NAPs 20 have directory services 21. These ensure that bus traffic is minimised by allowing the NAP 20 have immediate access to the relevant DBS 25.

While the bus of the HLR has been described as entirely external in nature, it is envisaged that it could be partly internal within a hardware system. For example, a NAP 20 and a DBS 25 could reside on a single hardware platform, in which case that particular NAP would access the DBS via an internal bus. Any other NAPs would access that DBS as described above via the external bus. The important point is that for each memory database, there is only one access route, namely, its associated DBS and a bus linking it with clients in the HLR.

The invention is not limited to the embodiments described, but may be varied in construction and detail.

What is claimed is:

1. A mobile telecommunications network home location register comprising:
    a high speed bus;
    at least two database servers, each directly connected to a memory database of subscriber data, and connected to the bus;
    at least one network access processor connected to the bus and comprising means for accessing subscriber data on the memory database via the bus and the database servers;
    a maintenance processor having operator interfaces, being connected to the bus, and comprising means for accessing subscriber data on the memory databases via the bus and the database servers;
    a storage database for storing data to be updated;
    wherein the network access processor comprises means for performing a transaction-oriented commit for updating a memory database whereby an update is not committed by the database server until the network access processor ends the transaction; and
    wherein the network access processor includes a directory service indicating location of subscriber data on the memory databases.

2. The home location register as claimed in claim 1, wherein the maintenance processor comprises means for updating the directory service.

3. The home location register as claimed in claim 1, wherein each item of subscriber data is stored in an active location on one memory database and also in a shadow location on a different memory database.

4. The home location register as claimed in claim 3, wherein the directory service of the network access processor identifies the database server having access to the memory database storing the active locations for each item of subscriber data.

5. The home location register as claimed in claim 4, wherein the database servers each comprise means for dynamically updating the shadow locations upon updating the associated active locations.

6. The home location register as claimed in claim 5, wherein the database server comprises means for updating the shadow locations according to one of a plurality of pre-stored schemes according to desired performance and security levels.

7. The home location register as claimed in claim 1, wherein the network access processor comprises means for uploading bus status and error signals to the maintenance processor.

8. The home location register as claimed in claim 1, wherein the maintenance processor comprises means for partitioning the subscriber data between memory databases by control of the database servers.

9. The home location register as claimed in claim 1, wherein the maintenance processor is directly connected to the storage database and comprises means for accessing the memory databases via the database servers to update the storage database.

10. The home location register as claimed in claim 1, wherein the maintenance processor comprises means for replicating the subscriber data in the storage database.

11. The home location register as claimed in claim 1, further comprising an auxiliary processor connected to the bus and comprising means for accessing subscriber data in the memory databases via the bus and the database servers.

12. The home location register as claimed in claim 1, wherein each database server comprises a core connected to a database handler, in turn connected to the memory database and to a plurality of external handlers connected to the bus.

13. The home location register as claimed in claim 12, wherein the core comprises a plurality of finite state machine dialogue handlers, each for performing core operations of a single transaction at one time.

14. The home location register as claimed in claim 13, wherein an external handler comprises means for activating a dialogue handler upon receipt of a transaction request, and means for identifying by way of a parameter value the transaction and the dialogue handler.

15. The home location register as claimed in claim 13, wherein the external handler, the dialogue handler and the database handler comprise means for identifying subscriber data retrieved in the transaction as an object having an identifier and a server memory location.

16. The home location register as claimed in claim 15, wherein the dialogue handler comprises means for identifying the external handler for a particular transaction by way of a temporary identifier.

17. A mobile telecommunications network home location register comprising:

at least two database servers, each directly connected to a memory database of subscriber data, and connected to the bus;

at least one network access processor connected to the bus and comprising means for accessing subscriber data on the memory database via the bus and the database servers;

a maintenance processor having operator interfaces, being connected to the bus, and comprising means for accessing subscriber data on the memory databases via the bus and the database servers;

a storage database for storing data to be updated;

wherein each database server comprises means for identifying dirty subscriber data items, namely those which have not been updated to the storage database;

wherein each database server comprises means for determining if any item has been updated to the storage database if a request is received from the maintenance processor for a subsequent item to be updated;

wherein the dirty items are identified by a flag within each item; and wherein the network access processor comprises a directory service indicating location of subscriber data on the memory databases.

18. The home location register as claimed in claim 17, wherein each database server comprises means for immediately changing the flag to a clean status after transmitting the item to the maintenance processor to update the storage database, and for setting it again to a dirty status if a negative response is received from the maintenance processor.

* * * * *